United States Patent

[11] 3,629,495

[72] Inventor Lysle D. Cahill
Dayton, Ohio
[21] Appl. No. 803,912
[22] Filed Mar. 3, 1969
[45] Patented Dec. 21, 1971
[73] Assignee The Mead Corporation
Dayton, Ohio

[54] SCANNER WITH ANALOG TO DIGITAL SIGNAL CONVERSION
5 Claims, 2 Drawing Figs.

[52] U.S. Cl. .......... 178/6.6 A, 178/7.2, 178/7.6
[51] Int. Cl. .......... H04n 1/04, H04n 1/28
[50] Field of Search .......... 178/6.6 A, 6, 7.6, 6.6, 7.2 D, 6.7, DIG. 3, 7.7; 315/11, 10

[56] References Cited

UNITED STATES PATENTS
3,272,918 9/1966 Koll et al. .......... 178/6.6

*Primary Examiner*—Bernard Konick
*Assistant Examiner*—Steven B. Pokotitow
*Attorney*—Marechal, Biebel, French & Bugg ABSTRACT: A scanner focuses a beam of radiant energy, in the order of one micron diameter, and this beam is scanned over a graphic representation, such as a photographic negative or film positive. The amount of radiant energy passing through the graphic representation varies with the density of the image at any given spot and is sensed by a transducer. This variable signal is converted to a digital signal which is recorded at regular intervals. The scanning movement and the recording frequency are both clocked from a crystal controlled oscillator, resulting in a precisely controlled digital signal output which is recorded for subsequent reproduction of the image represented.

INVENTOR

LYSLE D. CAHILL

BY

Marechal, Biebel, French & Bugg
ATTORNEYS

SCANNER WITH ANALOG TO DIGITAL SIGNAL CONVERSION

CROSS-REFERENCE TO RELATED APPLICATION

This application is related to copending application Ser. No. 803,910, entitled METHOD AND SYSTEM FOR RECONSTRUCTION OF IMAGES, filed concurrently herewith and disclosing the subject matter of this application as part of a system for reproducing images.

BACKGROUND OF THE INVENTION

This invention relates to image-scanning devices of the type disclosed in U.S. Pat. No. 3,307,020, issued Feb. 28, 1967, and particularly to an improved scanning control whereby digital signals are obtained and recorded as code words providing a record of the image. Each code word represents the density of a predetermined spot or point on the image with reference to a density scale ranging from black to white through a predetermined number of steps. The scanner employs a small precisely defined beam of radiant energy, for example a light beam in the order of 1 micron diameter, which is scanned over the graphic representation to be reproduced. This may be for example a halftone photographic negative or film positive through which the beam is passed to a photodetector, or a halftone image from which the beam is reflected to a photodetector. In either event, the beam is modulated by the relative density of each point scanned by the beam, and the resulting analog signal is converted to a digital signal which varies along a scale established to represent the tonal gradation between black and white. The scanning motion control is derived from a crystal-controlled oscillator, and switching signals derived from this same oscillator are employed to control the recording of the digital signals. Therefore, each recorded digital signal, in sequence, represents the tonal value of a predetermined spot on the original graphic representation, and the signals are recorded in sequence such that the image can be reproduced by reading these signals in the order, and producing a similar scanning motion for marking on a sheet or the like.

Accordingly, the primary object of the invention is to provide a novel control for an image scanning device and digital recorder, whereby the digital signals representing incremental areas of the original are recorded in a precise sequence.

Other objects and advantages of the invention will be apparent from the following description, the accompanying drawings and the appended claims.

DESCRIPTION OF THE PREFERRED EMBODIMENT

Figure 1:
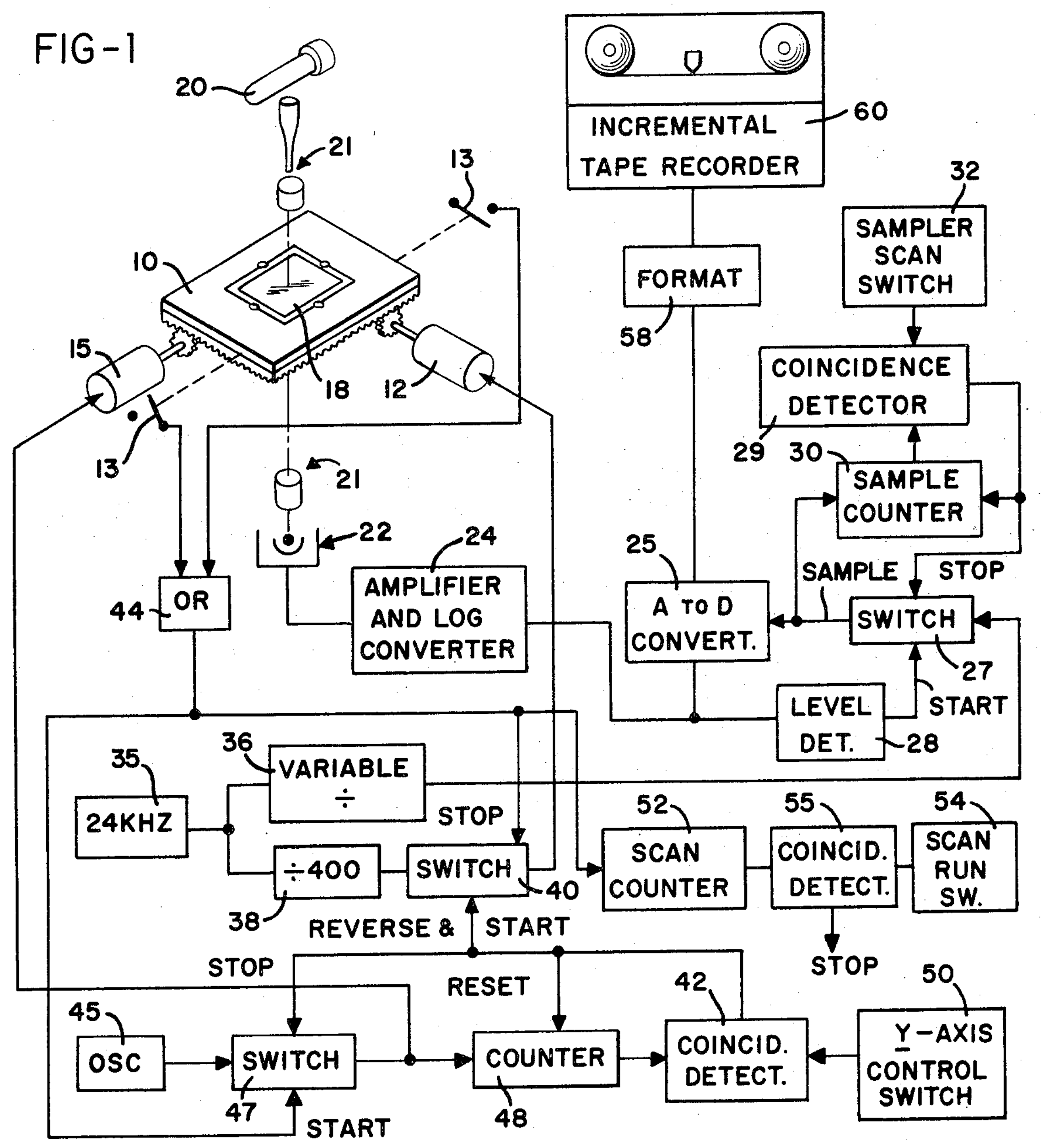
FIG. 1 is a block diagram, together with a schematic representation of the scanner, illustrating a system provided by the invention.

With reference to FIG. 1, a carriage 10 is suitably supported for scanning movement in the $x$-direction by a motor 12, through a conventional drive connection. Limit switches 13 are mounted so as to be operated respectively when the carriage reaches the desired opposite limits of its $x$ scanning motion. A second motor 15 is arranged to drive the carriage 10 for motion in the $y$-direction. The original representation to be scanned and analyzed is indicated generally at 18. This original may take different forms, such as a positive or negative photographic film, and may for example, be one of a set of color separations.

The image on the original is a gradation of tonal densities which may, for example, appear as portions of greater or lesser optical density. A light source 20 is focused into a scanning light beam of predetermined small cross-sectional dimension through an optical system 21, which includes parts that focus the beam onto a photomultiplier or other suitable light transducer 22. A suitable construction is disclosed in U.S. Patent No. 3,307,020, entitled HIGH INFORMATION DENSITY DATA RECORD AND READOUT DEVICE, and has the capability of producing a scanning spot of light or other radiant energy having a diameter in the order of one micron.

Figure 2:
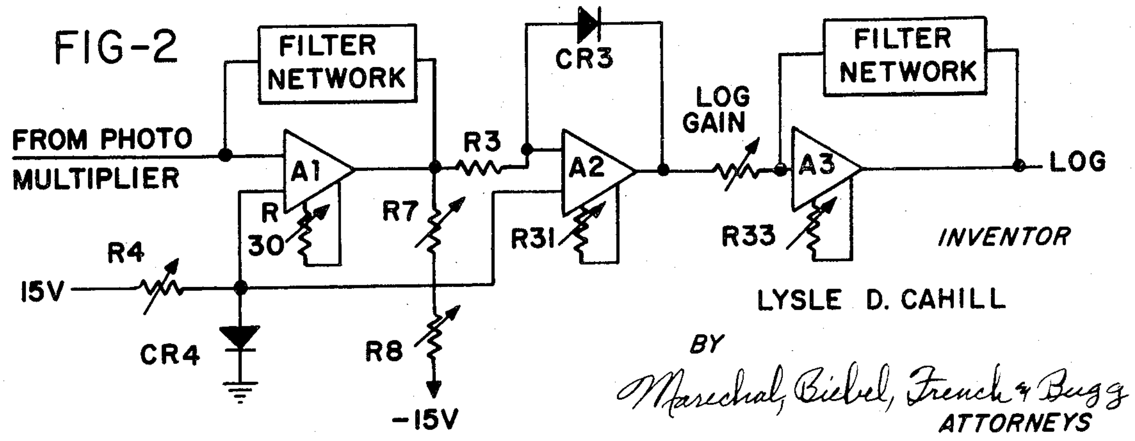
FIG. 2 is a diagram showing details of the amplifier-log converter unit shown in FIG. 1.

The photomultiplier 22 provides an output to an amplifier converter circuit 24, details of which are shown in FIG. 2. Essentially, this circuit embodies a three-stage amplifier, such as the series arranged operational amplifiers A1, A2 and A3. A semiconductor diode CR3 is connected across the amplifier stage A2, and the voltage across CR3 is proportioned to the log of the current passage through it. The filter networks connected across stages A1 and A3 are provided for noise suppression. The resulting output from this amplifier and converter circuit 24 is a voltage proportional to density on the original 18, an analog signal. It should be recognized that comparable signals obtained from an electronic scanning device can be utilized in the same manner as the derived signal previously described.

The output of circuit 24 is directed to an analog to digital (A to D) converter circuit 25, which is of conventional design, and which converts from the analog input signal to a digital output signal which, in one successful embodiment is a four digit BCD code, for example on a scale of 0 to 5. The converter circuit 25 is arranged for a gated type of operation, and provides digital output signals on a controlled timed basis, under the control of pulses from an electronic switch circuit 27. This switch circuit is turned on by means of a starting signal received from a level detector circuit 28, and the switch circuit 27 is turned of by an output signal from a coincidence detector circuit 29.

For example, a sharply defined starting edge can be provided by a mask positioned along one side of the original 18, at right angles to the direction of $x$ scan. When the sharp edge defined by the mask passes the scanning light beam, the resulting output from the photomultiplier 22 will rise above a predetermined low limit, and this increase in signal output strength through the amplifier circuit 24 will be detected by the detector 28 to turn on the switch circuit 27 and commence operation of the A to D circuit 25. Thus, when on the switch circuit 27 passes sample control pulses to the A to D circuit 25 and effectively gates its operation.

The sample pulses from the switch circuit 27 also are directed to the sample counter 30. The coincidence detector 29 compares the count in counter 30 with a predetermined and known count which is set into the samples per scan switch circuit 32 at the beginning of the operation. This count represents a known and desired number of samples per scan, and in fact divides the $x$ scanning operation into small and equal increments. When a coincidence is detected, an output from the detector circuit 29 turns off the switch circuit 27 and also resets the sample counter 30. The sample pulses are derived from a 24 kHz. crystal controlled oscillator 35, through a variable divider circuit 36, which provides sample pulses at some predetermined division to the electronic switch circuit 27. In an embodiment actually reduced to practice, a variable divider circuit having a range from 25 Hz. to 1 kHz. has been used. The same oscillator 35 also feeds pulses to a divider circuit 38 which is arranged to divide by 400, thus providing at its output a stable 60 Hz. signal. This signal is fed through an electronic switch 40 to the $x$-scan drive control 12. This drive signal to the motor 12 is also directional, in order to control back and forth scanning movement of the carriage 10.

The switch circuit 40 is turned on by an output signal from a coincidence detector circuit 42, and is turned off by an output signal from an OR-gate 44. The limit switches 13 each provide inputs to OR-gate 44, thus indicating the physical limit of one $x$-scan movement of the carriage in either direction.

A low-frequency oscillator 45 (about 10 Hz.) provides further control pulses to an electronic switch circuit 47. This switch circuit is turned on by an output from OR-gate 44, and is turned off by an output from the coincidence detector 42.

When on, the switch circuit 47 passes control pulses from the low-frequency oscillator 45 to a counter 48, and also to the *y*-scan drive motor 15.

The *y* increment control switch circuit or register 50 provides a preset count to the detector circuit 42, according to the desired *y* scanning movement between successive *x* scans. It will be appreciated that this *y* scanning movement is relatively small, usually of an order corresponding to the amount of *x* scan movement occurring between successive scanning pulses. When the *y* scan movement is completed, an output from the coincidence detector 42 resets the counter 48, turns off the electronic switch 47, and transmits a "reverse and start" signal to electronic switch 40, causing the *x* scan drive motor 12 to start in the opposite direction from the motion previously completed.

Each signal from OR-gate 44 also adds a count to a scan counter 52. A scans per run switch circuit or register 54 is preset to a number indicating the number of total scans desired. The switch circuit 54 and the scan counter 52 provide outputs to a coincidence detector circuit 55, and when it detects completion of the desired number of scans, it provides an off signal which is suitably connected to stop the entire operation.

The output of the A to D circuit 25 preferably is fed through suitable formating circuits 58, which change the four digit BCD code from the converter 25 into a two byte, four digit BCD code (four bits per digit), which is recorded in an incremental tape recorder 60. A typical such recorder has the capability of recording in incremental fashion 2,000 characters per second. Use of this type of recorder eliminates the need for buffers between the output of the analyzing circuits and the recorder. However, it is possible to record blocks of data using appropriate buffers.

It should be noted that a stable drive signal (60 Hz.) is provided to the *x* scan motor 12, and is locked to the rate of sample pulse controlling the A to D circuit 25 since both of them are driven from the crystal control operation 45. The output of the scanning and analyzing part of the system is thus a magnetic tape recording in digital code form representing incremental density variations in the scanned original.

The information on the tape is in the form of a succession of digital code words which are arranged in sequence according to the direction of the scan. The code words thus are in the same positional correlation as the increments scanned from the original, with the back and forth scan illustrated, code words for successive lines are in the same order. If it is desired to reproduce an image from the code record using scans all in the same direction, the order of code words in every other line can be reversed either prior to recording, through an appropriate buffer and interface, or in a subsequent recording or playback operation.

While the form of apparatus herein described constitutes a preferred embodiment of the invention, it is to be understood that the invention is not limited to this precise from of apparatus, and that changes may be made therein without departing from the scope of the invention.

What is claimed is:

1. In a scanner for producing digital signals representative on a variable density basis of a graphic representation scanned line by line, the combination of

- means for producing a focused beam of radiant energy,
- means for supporting a graphic representation to be scanned by the beam,
- drive means connected to cause relative movement between the beam and the representation at a predetermined rate,
- a transducer responsive to variations in the beam after modulation of the beam by the representation,
- a converter connected to receive the analog output of said transducer and produce corresponding digital signals,
- and control means including a source of clock pulses connected to power said drive means and synchronously to gate the output from said converter.

2. Apparatus as defined in claim 1, wherein said source of clock pulses includes a crystal controlled oscillator.

3. In a scanner as defined in claim 1, an incremental recorder connected to receive the digital signals and store the same for further use in producing an image of the graphic representation.

4. Apparatus for producing a digital record on a variable density basis of a graphic representation scanned line by line, comprising

- means for producing a focused beam of radiant energy,
- means for supporting a graphic representation to be scanned by the beam,
- a transducer responsive to variations in the beam after modulation of the beam by the representation,
- a converter connected to receive the output of said transducer and to produce corresponding digital signals,
- a recorder connected to receive the digital signals and to store the same for subsequent reproduction of an image of the graphic representation,
- a first motor connected to cause scanning movement between the representation and the beam over one dimension of the representation,
- a second motor connected to cause stepping movement between the representation and the beam along the other dimension between successive scans,
- a source of clock pulses for powering said first motor,
- a sample counter also receiving pulses from said source,
- first switch means controlling the supply of pulses to said first motor,
- second switch means controlling the supply of said digital signals to said recorder,
- and a control for said second switch means responsive to a predetermined number of pulses in said sample counter for causing said second switch to inhibit further supply of digital signals to said recorder.

5. Apparatus as defined in claim 4, including means for stepping said second motor after the completion of each scanning movement and for reversing said first motor to produce successive parallel scans in opposite directions.

* * * * *